United States Patent [19]

Reimann et al.

[11] Patent Number: 4,786,413
[45] Date of Patent: Nov. 22, 1988

[54] PROCESS FOR BIOLOGICAL SEWAGE PURIFICATION

[75] Inventors: Hans Reimann; Uwe Fuchs, both of Munich, Fed. Rep. of Germany

[73] Assignee: Linde Aktiengesellschaft, Wiesbaden, Fed. Rep. of Germany

[21] Appl. No.: 5,985

[22] Filed: Jan. 21, 1987

[30] Foreign Application Priority Data

Jan. 21, 1986 [DE] Fed. Rep. of Germany ....... 3601669

[51] Int. Cl.$^4$ ................................................. C02F 3/08
[52] U.S. Cl. ..................... 210/616; 210/623; 210/631; 210/903
[58] Field of Search ............... 210/616, 618, 605, 614, 210/621, 623, 624, 631, 903, 630

[56] References Cited

U.S. PATENT DOCUMENTS

| | | | |
|---|---|---|---|
| 4,500,429 | 2/1985 | Reimann et al. | 210/616 |
| 4,521,311 | 6/1985 | Fuchs et al. | 210/616 |
| 4,566,971 | 1/1986 | Reimann et al. | 210/616 |

FOREIGN PATENT DOCUMENTS 49-64621 10/1972 Japan ................................. 210/616
54-24455 2/1979 Japan ................................. 210/616

Primary Examiner—Tom Wyse
Attorney, Agent, or Firm—Millen & White

[57] ABSTRACT

In a process for the biological sewage purification of sewage containing organic as well as nitrogen-containing pollutants, carbon decomposition and nitrogen removal are performed. The sewage is gassed with air and/or pure oxygen in a reactor in the presence of a biomass fixed on a support material and then, in a secondary sedimentation step, is separated into purified water and sludge. The sludge is at least partially recycled into the reactor. Particles of support material in lumpy and/or granulated form and in free-flowing quantities are employed in the reactor as support material for the microorganisms. To attain both a high carbon and a high nitrogen decomposition at the same time, the reaction is provided with BOD$_5$ volume load of 0.4 to 2.5 kg/m$^3$d and a TKN volume load of 0.1 to 0.8 kg/m$^3$. d, BOD$_5$ decomposition, nitrification and denitrification are all performed within an undivided reactor, in which the O$_2$ concentration within the liquid is 0.5 to 4 mg/l and the support material occupies 15 to 35% of the reactor volume.

22 Claims, 1 Drawing Sheet

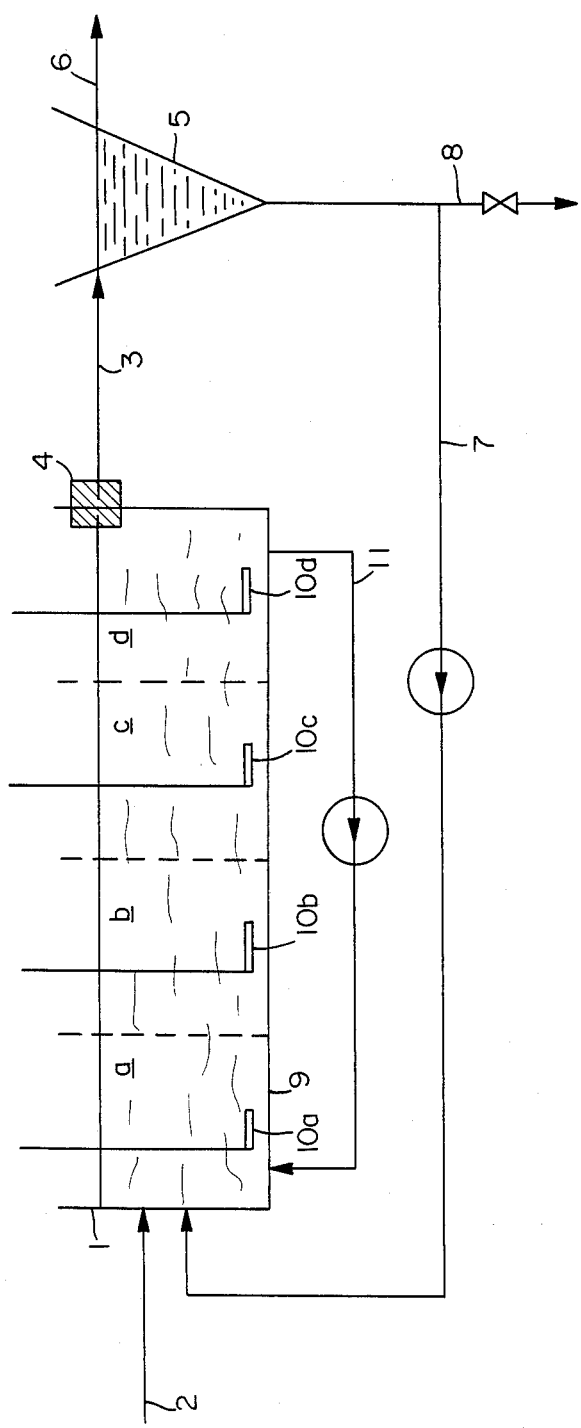

PROCESS FOR BIOLOGICAL SEWAGE PURIFICATION

BACKGROUND OF THE INVENTION

The invention relates to a process for the biological sewage purification of sewage containing organic as well as nitrogen-containing pollutants, in which the sewage is aerated with air and/or pure oxygen in a reactor in the presence of a biomass fixed on a support material and then, in a secondary sedimentation step, is separated into purified water and sludge. The sludge is at least partially recycled from the secondary sedimentation step back to the reactor. Also, particles of free flowing support material in lumpy and/or granulated form in the sewage are employed in the reactor as support material for the microorganisms of the biomass.

Such a process is known, for example, from EP-B 15 298, incorporated by reference herein. In this process the sewage is conducted through a reactor which is designed as a completely intermixed activated sludge tank with a circulation device or as a fluid bed or fluidized bed reactor. To attain a high purification value of particularly heavily loaded sewage, support particles of synthetic organic polymer compounds of a specific particle size are placed in the reactor. Moreover, activated sludge is, at least periodically, recycled from the secondary sedimentation step into the reactor and, in addition to the biomass fixed to the support particles, free biomass also is kept in the reactor. The support particles offer a large surface area for supporting microorganisms which, because of the macropores of the support particles, are forced to experience a decentralized growth. By this means a considerably increased material exchange surface results in comparison to the usual activated sludge flocs. The microorganisms are firmly supported in the pores of the particles of material and therefore can easily be retained in the reactor. Thus, even with very high sewage load an excellent carbonaceous $BOD_5$ (5-day BOD) decomposition can be attained. The indicated size of the individual support particles (diameter of 5 to 50 mm, specific weight of 10 to 200 kg/m$^3$, open macropores of 0.1 to 3 mm) results in stable bacterial settlements and guarantees an oxygen supply and a material transfer into the interior of each particle. Thus, an economical purification of $BOD_5$-loaded sewage is attained in an effective manner with the known process. However, with the known process only a slight decomposition of nitrogen compounds can be performed.

Form DE-OS No. 31 31 989, incorporated by reference herein, a process is known with which both a $BOD_5$ decomposition and a nitrification, i.e., conversion of ammonia first to nitrites and then to nitrates, can be performed. For this purpose the sewage is conducted through several treatment zones one after the other and aerated there in the presence of activated sludge. In the first treatment zone or zones the decomposition of the carbon compounds is attained in a known way, and to the extent that the outflowing sewage-activated sludge mixture is loaded only slightly. Then in the last treatment zone or zones nitrification is performed in the presence of nitrifying bacteria fixed on a support material. In a subsequent secondary sedimentation step purified water is separated from sludge and removed. The sludge is partly recycled to the first treatment zone (C decomposition) and partly removed as waste sludge. In this known process there is also the possibility of feeding a part of the sewage-activated sludge mixture flowing from the nitrification zone to the first treatment zone (C decomposition) before the secondary sedimentation, to perform a denitrification of the sewage. Thus, for an extensive decomposition of the nitrogen compounds a high expenditure of energy is necessary for recycling of activated sludge from the secondary sedimentation, on the one hand, and of the sewage-activated sludge mixture from the nitrification zone to the $BOD_5$ decomposition zone, on the other hand. Moreover, in this way a complete denitrification cannot be attained.

Moreover, from gwf (Gas and Water Engineering) 124 (1983), No. 9, pages 410–427, incorporated by reference herein, an activated sludge process with simultaneous carbon and nitrogen decomposition is known. In this article which shows the dimensioning possibility of a one-stage activated sludge installation for nitrification and denitrification, the dependence of nitrification or denitrification on sludge age (i.e., mean cell residence time), carbon respiration and sludge load is discussed. The author of the article thus comes to the following result: an optimal nitrification is attained at a $BOD_5$ volume load of 0.5 kg/m$_3$·d. If a denitrification is to be performed at the same time, the tank volume is increased about 30% and a complete nitrogen separation is attained at a $BOD_5$ volume load of 0.3 kg/m$^3$·d. The TKN (TKN =Total Kjeldahl nitrogen) volume load for simultaneous nitrification and denitrification in this case amounts to about ¼ of the $BOD_5$ volume load, in other words, to about 0.07 kg/m$^3$·d (TKN volume load for nitrification alone is about 0.1 kg/m$^3$·d).

Further, it is to be gathered from the article that the essential and limiting factor of the nitrification is the comparatively small growth rate of the nitrifying bacteria. Therefore, to attain a good nitrification performance, the sludge age must be set correspondingly high. Moreover, the entire tank volume must be sufficiently supplied with oxygen, and usually the $O_2$ concentration is at least 2 mg/l.

In contrast with the nitrification, which represents the oxidation of $NH_4$ nitrogen, denitrification is the use of nitrate-oxygen for respiration instead of dissolved oxygen, i.e., oxygen carried in by the aeration. A condition for denitrification is therefore that little or no dissolved oxygen be present. However, even when a small portion of dissolved oxygen is present, i.e., an amount which is no more than ¼ of the $O_2$ content necessary for nitrification, denitrification processes do occur, particularly in the nitrifying activated sludge tank. According to the author of the article, denitrification processes occur particularly in oxidation ditches, since dissolved oxygen is substantially no longer present at a certain distance from the aerator.

According to the author, the basic principle of simultaneous nitrification and denitrification centers around the fact that in an undivided activated sludge tank with nitrification, oxygen-free zones are created, in which the denitrification can occur. This means that the possibility of performing simultaneous nitrification and denitrification comes down to whether or not the system possesses means for appropriate aeration control. In this connection, a disadvantage of the simultaneous nitrification/denitrification step is that the resultant tank volumes necessarily become larger, since in the volume in which denitrification takes place, i.e., where there is little or no dissolved oxygen, no nitrification can take place and, in addition, the denitrification rate is reatively low. Therefore, in order to produce low nitrogen values in the discharged wastewater, a generous dimensioning of the nitrification/denitrification volume must be present.

SUMMARY OF THE INVENTION

The object of the invention is to develop a process of the initially mentioned type wherein, in a simple and economical way, both a high carbon and a high nitrogen decomposition can be constantly attained and in which the disadvantages of the known processes are overcome.

Upon further study of the specification and appended claims, further objects and advantages of this invention will become apparent to those skilled in the art.

These objects of the invention are attained by performing within a reactor with a $BOD_5$ volume load of about 0.4 to 2.5 kg/m$^3$·d, preferably 0.7 to 1.5 kg/m$^3$·d, and a TKN volume load of 0.1 to 0.8 kg/m$^3$·d, preferably 0.2 to 0.4 kg/m$_3$·d, $BOD_5$ decomposition, a nitrification and a denitrification at the same time, i.e., in the same, preferably undivided tank, in which an $O_2$ concentration in the liquid of about 0.5 to 4 mg/l is set and the support material for microorganisms occupies about 15 to 35% of the reactor volume. The preferred corresponding ranges are:

$BOD_5$ volume load: 1.0 kg/m$^3$
TKN volume load: 0.3 kg/m$^3$
$O_2$ concentration: 2 mg/l (average concentration over entire reaction volume)
Support material occupies 25% of the reactor volume Thus, with the process according to the invention a decomposition of the carbon and also of the nitrogen compounds is performed simultaneously in a single activated sludge stage, in which, within the activated sludge tank, free activated sludge and activated sludge fixed within the pores of mobile support particles are both present. The removal of nitrogen means that both nitrification and denitrification take place side by side. Dissolved oxygen is always present in the activated sludge tank.

In contrast with the known processes, in a process according to the invention, the $BOD_5$ volume load, as well as the TKN volume load, is somewhat higher. Yet, in contrast with the opinion prevailing among experts, it has been shown in a surprising way that with these high volume loads and $O_2$ concentrations excellent purification performances are attained.

However, before treatment in an activated sludge tank the sewage is initially purified of coarse materials, which, for example, can be done in a screen or sedimentation tank (i.e., a primary sedimentation step). Filtered material intake is the amount suspended solids in the influent after e.g. primary sedimentation. In this case, the filtered materials intake was about 50-150 mg/l.

Thus, after removal of coarse materials, the sewage is introduced into the reactor and is subjected to an activated sludge treatment wherein both carbon and nitrogen compounds are decomposed. For this purpose, in an advantageous way a plurality of zones of different aeration, especially zones of strong and weak aeration, are maintained in the reactor. The type of supplying of the activated sludge tank with oxygen-containing gas in the form of air and/or industrial oxygen can take place in a known way. Thus, for example, the oxygen-containing gas can be introduced at the bottom of the reactor by a conventional fine, medium or coarse bubble aeration means, in which the oxygen feed is kept lower in zones of weak aeration than in the zones of strong aeration. The temperature is given by the naturally occuring temperature of the waste water.

The preferred range of the pH level is 7-7.8.

The biomass which is fixed on the support particles and the free biomass in this case are suitably circulated between these zones of strong and weak aeration. This procedure successfully produces a finite content of dissolved oxygen throughout the entire tank which is available to the free biomass, but the fixed biomass periodically and at some points is partially subjected to anoxic conditions. With great advantage the $O_2$ concentration in zones of strong aeration is adjusted to a value of about 1 to 4 mg/l, preferably 2 to 4 mg/l, and in zones of weak aeration to a value of about 0.5 to 1 mg/l, preferably 0.5 to 0.7 mg/l. Thus, carbon decomposition and nitrification can preferably be performed in the zones of strong aeration, while denitrification processes take place in zones of weak aeration.

For the reactor to be used within the process those reactor designs known in art are suitable. Treatment tanks wherein wastewater flows through lengthwise, which exhibit a length/width ratio of at least about three, are advantageously used. Zones of strong and weak aeration preferably are alternately placed in such tanks along the direction of flow.

Moreover, in a treatment tank with lengthwise flow preferably a portion of the tank contents (i.e., the amount of wastewater and activated sludge recycle introduced into the reactor) of about 20 to 100% by volume is recycled from the end to the beginning of the tank. With this procedure a complete denitrification of the sewage is guaranteed. The amount of activated sludge recycled from this secondary sedimentation step back to the inlet of the reactor is about 50 to 100 volume % of the amount of wastewater introduced into the reactor.

Particles of material of polyurethane flexible foam, urea-formaldehyde resins, polyethylene, polypropylene, silicon polymer or the like are used as support particles in the process according to the invention. Also mixtures of two or more of these materials or particles of material from similar materials with open pores, as they occur in the plastics processing industry, can be used. The specific weight of the support material is preferably about 10 to 200 kg/m$^3$. The support particles have a particle size of about 5 to 40 mm, preferably 12 to 15 mm, and a pore diameter of generally about 0.2 to 1 mm, preferably 0.3 to 0.8 mm.

In addition, according to a preferred embodiment of the process according to the invention, a ratio of the average diameter of the support particles to the average pore diameter of about 5:1 to 30:1 is established. Also two different types of support particles with different particle and pore diameters can be used in the activated sludge tank with particular advantage. In this connection, it has proved extremely favorable if, according to another embodiment of the process according to the invention, a first group of support particles with a ratio of average particle diameter to average pore diameter of 5:1 to 15:1 and a second group of support particles with a ratio of average particle diameter to average pore diameter of 20:1 to 30:1 are used. As tests have shown, particles with a smaller average particle diameter to average pore diameter ratio of about 5:1 to 15:1, especially 10:1 to 15:1, are suitable for nitrification. As an example, cubical support particles with an edge length (average particle diameter) of about 5 to 15 mm and an average pore diameter of about 0.3 to 0.8 mm are particularly suitable for nitrification. On the other hand, cubes with an edge length of about 20 to 40 mm and a pore diameter of about 1 to 1.3 mm, i.e., a ratio of average particle diameter to average pore diameter of 20:1 to 30:1, are particularly well suitable for denitrification. With somewhat larger support particles anoxic zones can additionally be produced within the interior of the support particles so that denitrification processes take place within the interior of the particles, while nitrification and BoD$_5$ decomposition take place on the outside of the support particle. In this connection, it should be noted that these biological processes also occur if only one type rather than two types of support particles is used.

The process according to the invention has the advantages (a) that it represents a simple single-stage sludge process, (b) that the tank volumes in comparison with the known processes can be designed smaller, whereby significant savings in investment costs result, (c) that energy savings are possible with the recycling currents, and (d) that higher degrees of elimination can be attained for nitrogen. Installations already in operation can be changed over, if the parameters according to the invention for the volume loads, the O$_2$ concentrations and the support particles are observed.

BRIEF DESCRIPTION OF THE DRAWINGS

Various other objects, features and attendant advantages of the present invention will be more fully appreciated as the same becomes better understood when considered in conjunction with the accompanying drawing which illustrates an installation for performing the process according to the invention.

DETAILED DESCRIPTION OF THE DRAWINGS

A reactor designed as a completely intermixed activated sludge tank is identified as 1. In activated sludge tank 1 are placed, as indicated by the shading, particles of material 9, which act as support particles of the microorganisms, with a diameter of about 25 mm, a specific weight of above 50 kg/m$^3$ and open pores of about 1 mm diameter, especially of polyurethane flexible foam in a free-flowing quantity, which corresponds to a volume portion of 25% of the volume of activated sludge tank 1.

The sewage to be treated is introduced by an intake 2 into activated sludge tank 1, while the treated sewage is removed by a discharge 3 placed in the upper area of activated sludge tank 1, for which, for example a simple sieve, can be a separation device 4 for retaining individual particles of material 9 within the activated sludge tank 1. Discharge 3 of activated sludge tank 1 is connected to a secondary sedimentation step 5 designed as a sedimentation tank which includes a discharge pipe 6 for purified sewage, a sludge recycling pipe 7 with pump for recycling of sludge into activated sludge tank 1 as well as a sludge discharge pipe 8 for excess sludge.

Activated sludge tank 1 in the embodiment can be divided into four different aeration zones a, b, c, d. Each of these zones, which are not separated from one another by separation wall or the like, exhibits its own air intake device 10a, 10b, 10c, 10d, respectively. The following O$_2$ concentrations are maintained in the zones by their corresponding air intake:
zone a: 0.5 to 1 mg/l
zone b: 1 to 4 mg/l
zone c: 0.5 to 1 mg/l
zone d: 1 to 4 mg/l.
Proportion of the length of the reactor:
 1/6 (zone a)
 ⅓ (zone b)
 1/6 (zone c)
 ⅓ (zone d)

The gas bubbles rising from the air intake devices produce sufficient uplift, to keep in suspension particles of support material 9, loaded with biomass, particles whose specific weight generally is only slightly above that of water, and to circulate them sufficiently between zones that are adjacent in each case.

Further, to tank zone d is connected a pipe 11 with pump, by which the sewage-activated sludge-support particle mixture is recycled into zone a. With a feed amount of sewage of Q, the recycled amount of sewage-activated sludge-support particle mixture is $Q_R = 1 \times Q$. The amount of recycled activated sludge from the secondary sedimentation can be expressed by $Q_{RS} = 1 \times Q$.

Below are given numerical data for a design example of an activated sludge installation A operated according to the process of the invention in comparison with a usual activated sludge installation B according to the article from gwf (Gas and Water Engineering) and C according to EP-B No. 75 298. As the data show, the installation according to the invention, exhibits overall improved nitrification and denitrification in comparison to the system according to EP-B No. 75 298 as shown by the comparative TKN and NO$_3$-N discharge. Also, the installation according to the invention provides nitrification/denitrification comparable to the installation according to the article from gwf (Gas and Water Engineering) but with a significant reduction in overall volume (2200 m$^3$ as compared to 5490 m$^3$)

| | | | A | B | C |
|---|---|---|---|---|---|
| Sewage intake | Q | m$^3$/d | 10,000 | 10,000 | 10,000 |
| BOD$_5$ of sewage intake | S$_O$ | mg/l | 220 | 220 | 220 |
| Filtered material intake | TS$_O$ | mg/l | 110 | 110 | 110 |
| TKN of sewage intake | TKN$_O$ | mg/l | 55 | 55 | 55 |
| Sludge concentration in activated sludge tank | TS$_B$ | kg/m$^3$ | 7.0 | 3.0 | 7.0 |
| Temperature in activated sludge tank | T | °C. | 15 | 15 | 15 |
| pH in activated tank | | | 7.5 | 7.5 | 7.5 |
| Volume of nitrification tank | V$_n$ | m$^3$ | — | 3490 | — |
| Volume of upstream denitrification tank | V$_D$ | m$^3$ | — | 2000 | — |
| Total tank volume | (V$_N$ + V$_D$) | m$^3$ | 2200 | 5490 | 550 |
| BOD$_5$ volume load | B$_R$ | kg/m$^3$ d | 1.0 | 0.4 | 4.0 |
| TKN volume load | B$_R$-TKN | kg/m$^3$ d | 0.25 | 0.1 | 1.0 |
| Discharge of purified sewage | Q-Q$_w$ | m$^3$/d | 10,000 | 10,000 | 10,000 |
| BOD$_5$ of discharge | BOD$_{5e}$ | mg/l | 10 | 10 | 25 |
| TKN of discharge | TKN$_e$ | mg/l | 5 | 5 | 44 |
| NO$_3$—N of discharge | NO$_3$N$_e$ | mg/l | 6 | 6 | 0 |

-continued

| | | | A | B | C |
|---|---|---|---|---|---|
| $NO_2$—N of discharge | $NO_2N_e$ | mg/l | <0.5 | <1 | |
| Waste sludge removed | $Q_w$ | m³/d | 60 | 50 | |
| Recycle of sewage-activated sludge - support particle mixture | $Q_R$ | % | 100 | 500 | |
| Recycle of activated sludge from secondary sedimentation | $Q_{RS}$ | % | 100 | 100 | 100 |
| Total recycle amount | $Q_{RS} + Q_R$ | % | 200 | 600 | 100 |
| Sludge Age | d | | | 6 | 6 |

In the drawing, although the tank is divided into four aeration zones, it is still an undivided tank. By undivided is meant totally undivided or divided by baffles, that occupy at maximum ⅔ of the cross section.

From the foregoing description, one skilled in the art can easily accertain the essential characteristics of this invention, and without departing from the spirit and scope thereof, can make various changes and modifications of the invention to adapt it to various usages and conditions.

We claim:

1. In a process for the biological sewage purification of sewage wastewater containing organic as well as nitrogen-containing pollutants, in which wastewater is aerated with air and/or pure oxygen in a reactor in the presence of a biomass fixed on a support material and then in a secondary sedimentation step, resultant effluent is separated into purified water and sludge, and the separated sludge is at least partially recycled into the reactor and in which free-flowing particles of material are employed in the reactor as supports for the microorganisms, the improvement comprising employing in an elongated undivided reactor a volume load of $BOD_5$ of about 0.4 to 2.5 kg/m³·d and a TKN volume load of about 0.1 to 0.8 kg/m³·d, and simultaneously conducting $BOD_5$ decomposition, nitrification and denitrification of the wastewater in the reactor wherein an $O_2$ concentration in liquid being treated is about 0.5 to 4 mg/l and the support material occupies about 15 to 35% of the reactor volume, so as to simultaneously decompose and remove carbon-containing and nitrogen-containing compounds from said wastewater in said undivided tank.

2. A process according to claim 1, wherein zones of strong and weak aeration are maintained within the reactor.

3. A process according to claim 2, wherein free and fixed biomass is circulated between the zones of strong and weak aeration.

4. A process according to claim 2, wherein $O_2$ concentration in zones of strong aeration is about 1 to 4 mg/l and in the zones of weak aeration the $O_2$ concentration is about 0.5 to 1 mg/l.

5. A process according to claim 2, wherein alternating zones of strong and weak aeration are formed within the reactor in the lengthwise direction of flow.

6. A process according to claim 4, wherein alternating zones of strong and weak aeration are formed within the reactor in the lengthwise direction of flow.

7. A process according to claim 1 wherein about 20 to 100% by volume of the contents of the reactor is recycled from the end to the beginning of the tank.

8. A process according to claim 1, wherein the support particles have a ratio of the average diameter to average pore diameter of about 5:1 to 30:1.

9. A process according to claim 1, wherein two different types of support particles are used with different particle and pore diameters.

10. A process according to claim 9, wherein a first type of support particles with a ratio of average particle diameter to average pore diameter of about 5:1 to 15:1 and a second type of support particle with a ratio of average particle diameter to average pore diameter of about 20:1 to 30:1 are employed.

11. A process according to claim 1, wherein the support particles are formed from polyurethane flexible foam, urea-formaldehyde resin, polyethylene, polypropylene or silicone polymer.

12. A process according to claim 10, wherein said first and second particle types are cubical in shape.

13. A process according to claim 1, wherein said support particles have a specific gravity of about 10 to 200 kg/m³.

14. A process according to claim 1, wherein said support particles have a specific gravity slightly above the specific gravity of water.

15. A process according to claim 1, wherein the amount of activated sludge recycled from the secondary sedimentation step is about equal to the amount of wastewater introduced into the reactor.

16. A process according to claim 7, wherein the amount reactor contents recycled is about equal to the amount of wastewater introduced into the reactor.

17. A process according to claim 1, wherein said support particles have a particle diameter of about 25 mm, a specific gravity of about 50 kg/m³, and pores with diameters of about 1 mm.

18. A process according to claim 1 wherein the volume load of $BOD_5$ is 0.7–1.5 kg/m³ and the TKN volume load is 0.2–0.4 kg/m³.

19. A process according to claim 4 wherein the volume load of $BOD_5$ is 0.7–1.5 kg/m³ and the TKN volume load is 0.2–0.4 kg/m³.

20. A process according to claim 4 wherein the $O_2$ concentration in the zones of strong aeration is 2–4 mg/l and the $O_2$ concentration in the zones of weak aeration is 0.5–0.7 mg/l.

21. A process according to claim 20 wherein the $O_2$ concentration in the zones of strong aeration is 2–4 mg/l and the $O_2$ concentration in the zones of weak aeration is 0.5–0.7 mg/l.

22. A process for the biological purification of sewage wastewater containing organic and nitrogen-containing pollutants, comprising:
    (a) introducing sewage into a first end of a single, elongated, undivided aeration tank, said aeration tank containing a biomass of activated sludge fixed on support particles and free activated sludge;
    (b) aerating said sewage in a first zone of said tank at such a rate to perform $BOD_5$ decomposition and nitrification of said sewage;
    (c) delivering sewage from said first zone to a second zone of said tank and aerating said second zone at such a rate to perform denitrification of said sewage;

(d) delivering said sewage from said second zone to additional sequential zones within said tank wherein said sequential zones alternate from zones aerated for $BOD_5$ decomposition and nitrification to zones aerated for denitrification;

(e) recycling a portion of sewage, activated sludge, and support particles from a final denitrification zone to said first zone; and (f) discharging purified sewage from a second end of said tank; wherein said tank has a volume load of $BOD_5$ of about 0.4 to 2.5 kg/m$^3$·d, a TKN volume load of about 0.1–0.8 kg/m$^3$·d, the $O_2$ in the wastewater being treated is about 0.5–4 mg/l and the support particles occupy about 15–35% of the tank volume.

* * * * *